US011025865B1

(12) United States Patent
Medasani et al.

(10) Patent No.: US 11,025,865 B1
(45) Date of Patent: Jun. 1, 2021

(54) CONTEXTUAL VISUAL DATASPACES

(75) Inventors: Swarup S. Medasani, Newbury Park, CA (US); Yuri Owechko, Newbury Park, CA (US); Kyungnam Kim, Newbury Park, CA (US); Alexander Krayner, Beverly Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 13/163,558

(22) Filed: Jun. 17, 2011

(51) Int. Cl.
*H04N 7/18* (2006.01)

(52) U.S. Cl.
CPC .................................. *H04N 7/181* (2013.01)

(58) Field of Classification Search
CPC .. H04N 13/161; H04N 13/128; H04N 13/139; H04N 13/194; H04N 7/181
USPC .......................................................... 348/43
See application file for complete search history.

(56) References Cited

U.S. PATENT DOCUMENTS

| 6,650,250 B2 | 11/2003 | Muraki | |
|---|---|---|---|
| 2002/0055823 A1* | 5/2002 | Kodaira | 702/42 |
| 2003/0076417 A1* | 4/2003 | Thomas | G07B 15/02 348/169 |
| 2004/0151342 A1* | 8/2004 | Venetianer | G06T 7/11 382/103 |
| 2008/0193010 A1* | 8/2008 | Eaton | G06K 9/00771 382/159 |
| 2008/0221792 A1* | 9/2008 | Nakayama | 701/211 |
| 2008/0258935 A1* | 10/2008 | Lee | 340/932.2 |
| 2008/0285802 A1* | 11/2008 | Bramblet | G07C 9/15 382/103 |
| 2009/0040501 A1* | 2/2009 | Matsuo | G01S 13/931 356/4.01 |
| 2009/0167568 A1* | 7/2009 | Seong | G08G 1/0969 340/995.1 |
| 2009/0240359 A1* | 9/2009 | Hyndman | H04L 65/4015 700/94 |
| 2009/0290032 A1* | 11/2009 | Zhang | B60R 1/00 348/211.9 |
| 2009/0304229 A1* | 12/2009 | Hampapur | G06K 9/00771 382/103 |

(Continued)

OTHER PUBLICATIONS

"Active Safety and Collision Alerts using Contextual Visual Dataspace" Kim, Kyungham; Owechko, Yuri; Medasani, Swarup. 2010 IEEE Intelligent Vehicles Symposium, University of California, San Diego, CA, USA. Jun. 21-24, 2010.*

(Continued)

*Primary Examiner* — Allen C Wong
(74) *Attorney, Agent, or Firm* — Lewis Roca Rothgerber Christie, LLP

(57) ABSTRACT

A method is disclosed. The method receives a two dimensional or a three dimensional computer generated representation of an area, receives a plurality of images of the area captured by one or more video cameras, detects a first moving object in the plurality of images, generates a computer representation of the first moving object, correlates the images of the area captured by the one or more video cameras with the two dimensional or three dimensional computer generated representation of the area, and displays the computer representation of the first moving object in the two dimensional or the three dimensional computer generated representation of the area.

28 Claims, 11 Drawing Sheets

(56) References Cited

U.S. PATENT DOCUMENTS

2010/0007525 A1* 1/2010 Shanbhag ............... G08G 1/14
340/932.2
2010/0100324 A1* 4/2010 Caminiti ............... G08G 1/164
701/301

OTHER PUBLICATIONS

Funck et al., "Determining Car-Park Occupancy from Single Images," IEEE Intelligent Vehicle Symposium, 4 pages, 2004.
Huang et al., "A Bayesian Hierarchical Detection Framework for Parking Space Detection," ICASSP, 4 pages, 2008.
Masaki et al., "Machine-Vision Systems for Intelligent Transportation Systems," IEEE Intelligent Systems, 8 pages, 1998.
Suhr et al., "Free Parking Space Detection Using Optical Flow-based Euclidean 3D Reconstruction," IAPR Conference on Machine Vision Applications, 4 pages, 2007.
Wu et al., "Parking Lots Space Detection," Machine Learning, 8 pages, 2006.

* cited by examiner

CONTEXTUAL VISUAL DATASPACES

FIELD

The present invention relates to Contextual Visual Dataspaces (CVD). More particularly, the present invention relates to configuring the contextual visual dataspaces to provide updates and/or warnings of real-world changes to CVD-equipped devices in real-time.

BACKGROUND

To provide a better awareness of the surroundings to the people, a need exists for a system capable of automatically notifying and/or warning the users in real-time of different events that may affect them.

For example, visual sensing of the environment around a vehicle is an important part of a system configured to detect and warn a driver of a possible collision. Current approaches to collision warning and avoidance rely on sensors such as video cameras, radars, or Light Detection and Ranging (LIDAR) technology that are mounted on the vehicle to warn a driver of a possible collision. However, this limits the sensing of only those objects that are visible from the driver's point of view.

Also, an automatic parking recommendation system could provide convenience for drivers by automatically recommending open parking spaces and guiding the driver towards them. However, there are many technical challenges in building parking spot recommendation systems. Current technologies are typically limited to the use of induction loops, road tubes, piezo-electric cables, and weight-based sensors. While these sensors are quite accurate their use would require that the existing facilities be refitted which is laborious, expensive, and causes interruption in service during installation.

Further, an automatic security monitoring system that can generate a warning when someone approaches a property could provide peace of mind to the property owners. However, current approaches either place sensors inside the house to warn the owners when someone has already entered their premises or utilize video cameras that monitor the outside of the house but require for someone to constantly monitor the recorded images to make sure no one will break into the house.

In contrast to the prior art, the system according to the present disclosure may provide better awareness of the surroundings to the users.

SUMMARY

According to a first aspect, a method is disclosed, comprising: receiving a two dimensional or a three dimensional computer generated representation of an area; receiving a plurality of images of the area captured by one or more video cameras; detecting a first moving object in the plurality of images; generating a computer representation of the first moving object; correlating the images of the area captured by the one or more video cameras with the two dimensional or three dimensional computer generated representation of the area; and displaying the computer representation of the first moving object in the two dimensional or the three dimensional computer generated representation of the area.

According to a second aspect, a method is disclosed, comprising: receiving a two dimensional or a three dimensional computer generated representation of an area; receiving global positioning coordinates of a first moving object in the area; generating a computer representation of the first moving object; and displaying the computer representation of the first moving object in the two dimensional or the three dimensional computer generated representation of the area based on the global positioning coordinates of the first moving object.

According to a third aspect, a program storage device readable by a machine, tangibly embodying a program of instructions executable by the machine to perform method for combining a two dimensional or three dimensional modeling with dynamic object detection is disclosed, the method comprising: receiving a two dimensional or a three dimensional computer generated representation of an area; receiving a plurality of images of the area captured by one or more video cameras; detecting a first moving object in the plurality of images; generating a computer representation of the first moving object; correlating the images of the area captured by the one or more video cameras with the two dimensional or three dimensional computer generated representation of the area; and displaying the computer representation of the first moving object in the two dimensional or the three dimensional computer generated representation of the area.

BRIEF DESCRIPTION OF THE FIGURES

FIG. 4b depicts a 2D representation of the parking lot depicted in FIG. 4a.

FIG. 6b-d depict security monitors depicting the building in FIG. 6a.

Figure 1A:
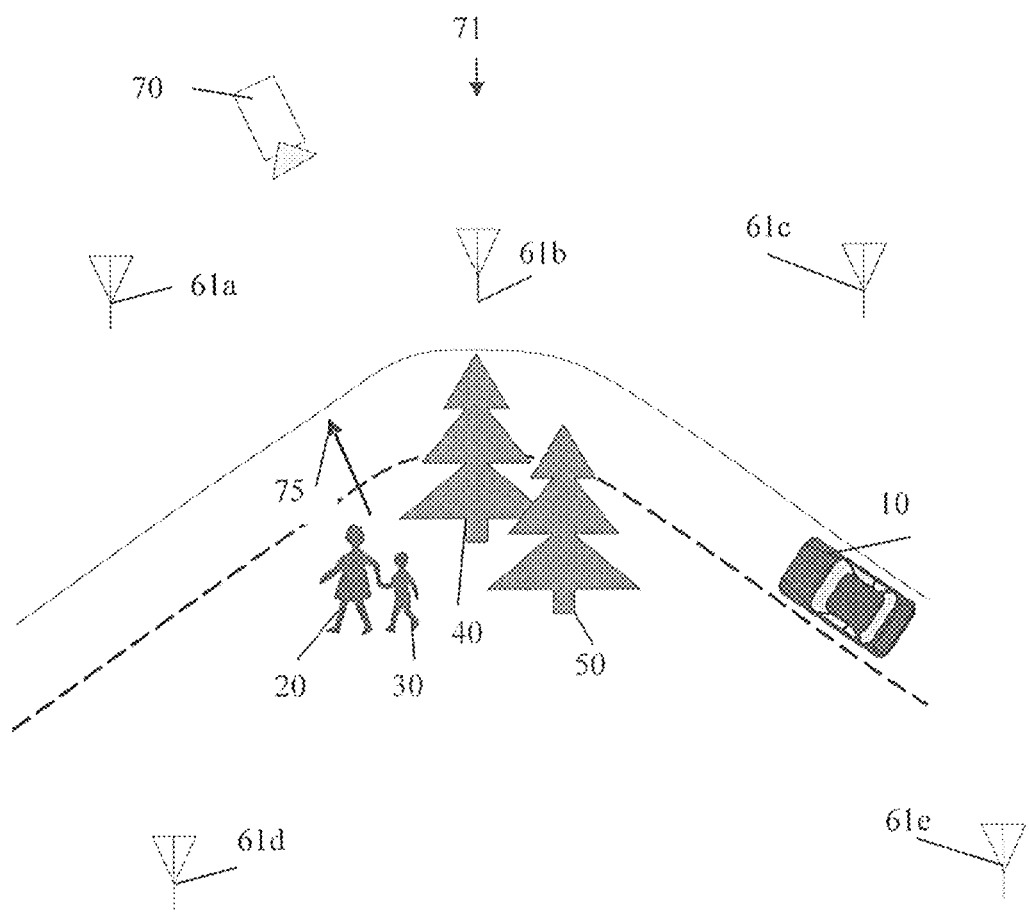
FIG. 1a depicts an exemplary area where a possible collision may occur.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Contextual Visual Dataspace (CVD) is a system for representing a real-time environment that combines 2D or 3D modeling and semantic labeling of a scene with dynamic object detection using, for example, Global Positioning information from such devices as cellular phones and/or using image information from such devices as one or more video cameras. The CVD-system according to the present disclosure may utilize a CVD sensing model by placing the sensors at the infrastructure, combining the multiple sensor outputs in an integrated representation framework, and transmitting a global, highly compressed, geo-registered view of the environment, including moving objects represented as, for example, computer avatars, to an end user. The sensors may be, for example, video cameras observing intersections, cellular networks, GPS devices, and/or loitering or scouting unmanned aerial vehicles (UAVs). The CVD framework may be used to share the cost of sensing among many users. The external sensors remove the viewpoint limitations of an individual end-user which enables new capabilities, such as detecting potential hazards around blind corners and the ability to change the viewpoint. Finally, the presently disclosed system may allow sensing capabilities to be treated as a service that can be easily updated and delivered with specified levels of performance.

In one exemplary embodiment, the CVD-system according to the present disclosure may be used to improve automotive safety. For example, an active safety system according to the present disclosure may utilize the CVD-system to, for example, detect and track dynamic objects of interest, geo-register them into the semantically labeled 2D or 3D world space, analyze the paths of vehicles and pedestrians, infer intent of their movement, make predictions of potential collisions, and alert the drivers and/or pedestrians of the potential collision in real-time.

Prior-art approaches to sensor fusion for active safety are focused on registration at the low level data or pixel level. Contrary to the prior art, the CVD approach, according to the present disclosure, focuses on representation, compression, and registration at the object level. The prior art infrastructure-based sensing is limited to systems such as traffic control that require vehicle-to-vehicle or vehicle-to-infrastructure communication. The CVD paradigm, according to the present disclosure, may use a global broadcast model which provides immediate benefit to a CVD-equipped end-user even if no other vehicle has it, unlike vehicle-to-vehicle systems in the prior art that can only detect other similarly-equipped vehicles. Finally, unlike vehicle-to-vehicle approaches in the prior art, CVD also has no privacy issues since the end-user does not need to provide information to the infrastructure or to other vehicles.

Referring to an area 71 depicted in FIG. 1a, driver of vehicle 10 may not see pedestrians 20 and 30 due to the obstacles/trees 40 and 50. Without the CVD-system presently described, driver of the vehicle 10 may collide with the pedestrians 20 and 30 should they attempt to cross the road/street 60 in the direction represented by arrow 75. With the CVD-system presently described, the driver of the vehicle 10 and/or pedestrians 20 and 30 may receive a warning before the collision occurs.

Figure 1B:
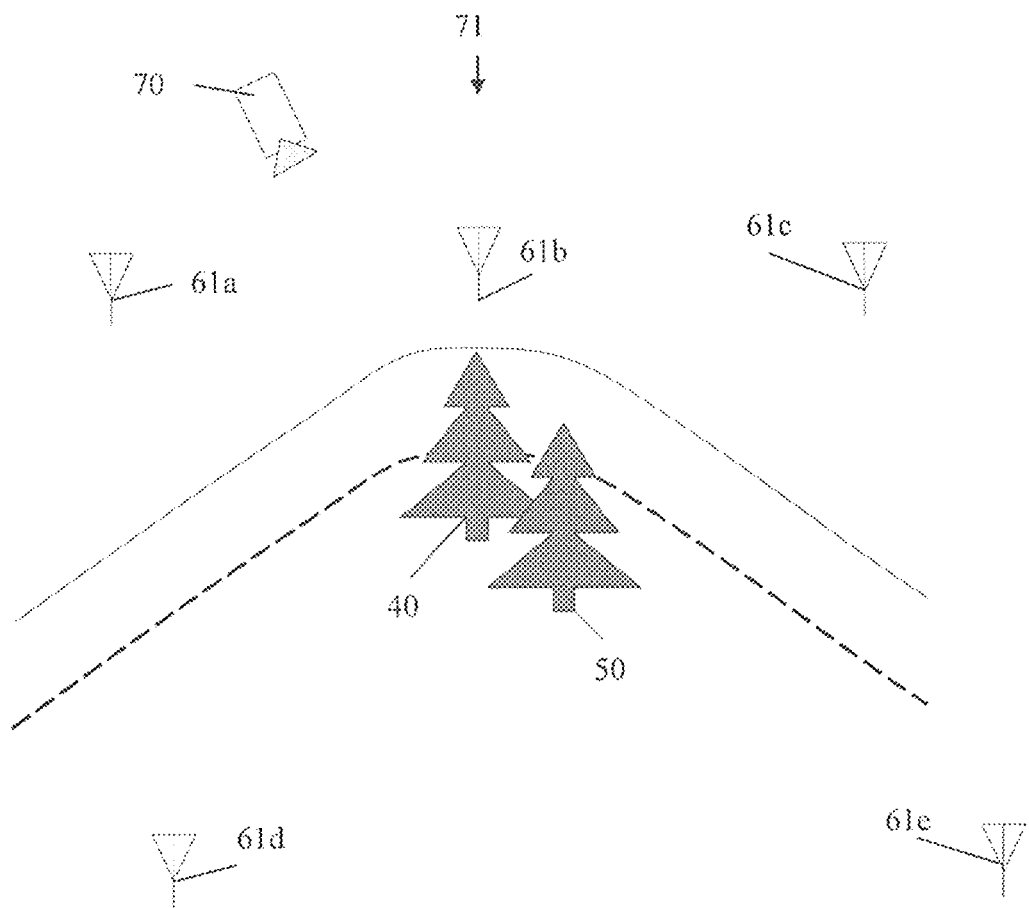
FIG. 1b depicts a 2 dimensional (2D) representation of the area depicted in FIG. 1.

In one exemplary embodiment, the CVD-system according to the present disclosure may utilize data from one or more detection sources to generate a 2D model of the area 71 as shown in FIG. 1b. The 2D model may depict and identify objects such as the road 60, trees 40 and 50, cellular phone towers 61a-e, etc. The 2D model may be generated using, for example, detection sources such as Image-based object detection and localization, Radar, Sonar, Light Detection and Ranging (LIDAR) or other mapping programs. It is to be understood that other detection sources may also be used to generate the required 2D model with location information for depicted objects. For example, the location information may be (x,y) coordinates on the map or (latitude, longitude) or some subset. The formation of the 2D segmented and labeled model shown in FIG. 1b may be performed once with occasional updates to incorporate any new buildings or other infrastructure. The segmentation and labeling of objects may be performed manually or automatically. Once the 2D model of a particular area has been generated, this 2D model may be utilized by all CVD-equipped vehicles and/or CVD-equipped cellular phones and/or other CVD-equipped portable devices that enter the modeled area.

Figure 2:
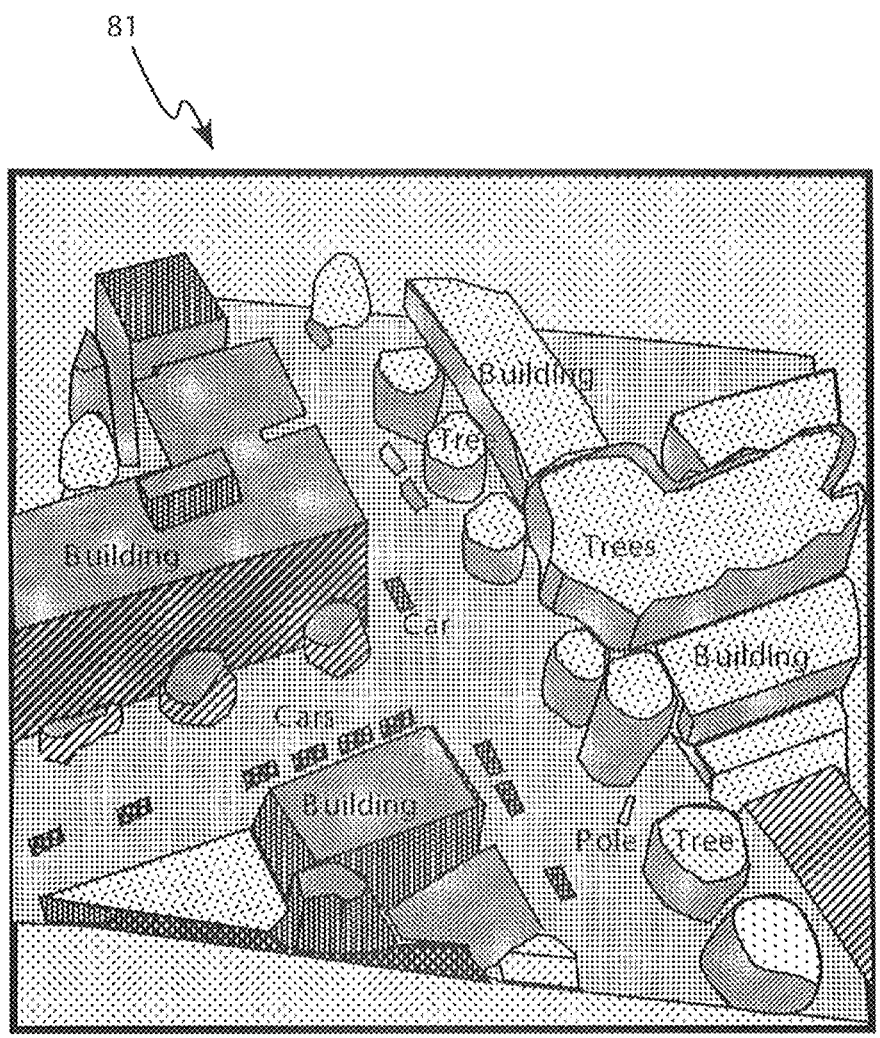
FIG. 2 depicts an exemplary 3 dimensional (3D) representation of an area.

In another exemplary embodiment, the CVD-system according to the present disclosure may utilize data from one or more detection sources to generate a 3D model of area 71 (not shown). The 3D model may depict and identify objects such as the road 60, trees 40 and 50, cellular phone towers 61a-e, etc. The 3D model may be generated using, for example, detection sources such as Image-based object detection and localization, Radar, Sonar, and Light Detection and Ranging (LIDAR). It is to be understood that other detection sources may also be used to generate the required 3D model with location information for depicted objects. For example, the location information may be (x,y,z) coordinates on the map or (latitude, longitude, altitude) or some subset. FIG. 2, depicts an exemplary 3D model 81 of an area generated using LIDAR system. The formation of the 3D segmented and labeled model shown in FIG. 2 may be performed once with occasional updates to incorporate any new buildings or other infrastructure. The segmentation and labeling of objects may be performed manually or automatically. Once the 3D model of a particular area has been generated, this 3D model may be utilized by all CVD-equipped vehicles and/or CVD-equipped cellular phones and/or other CVD-equipped portable devices that enter the modeled area.

Figure 3:
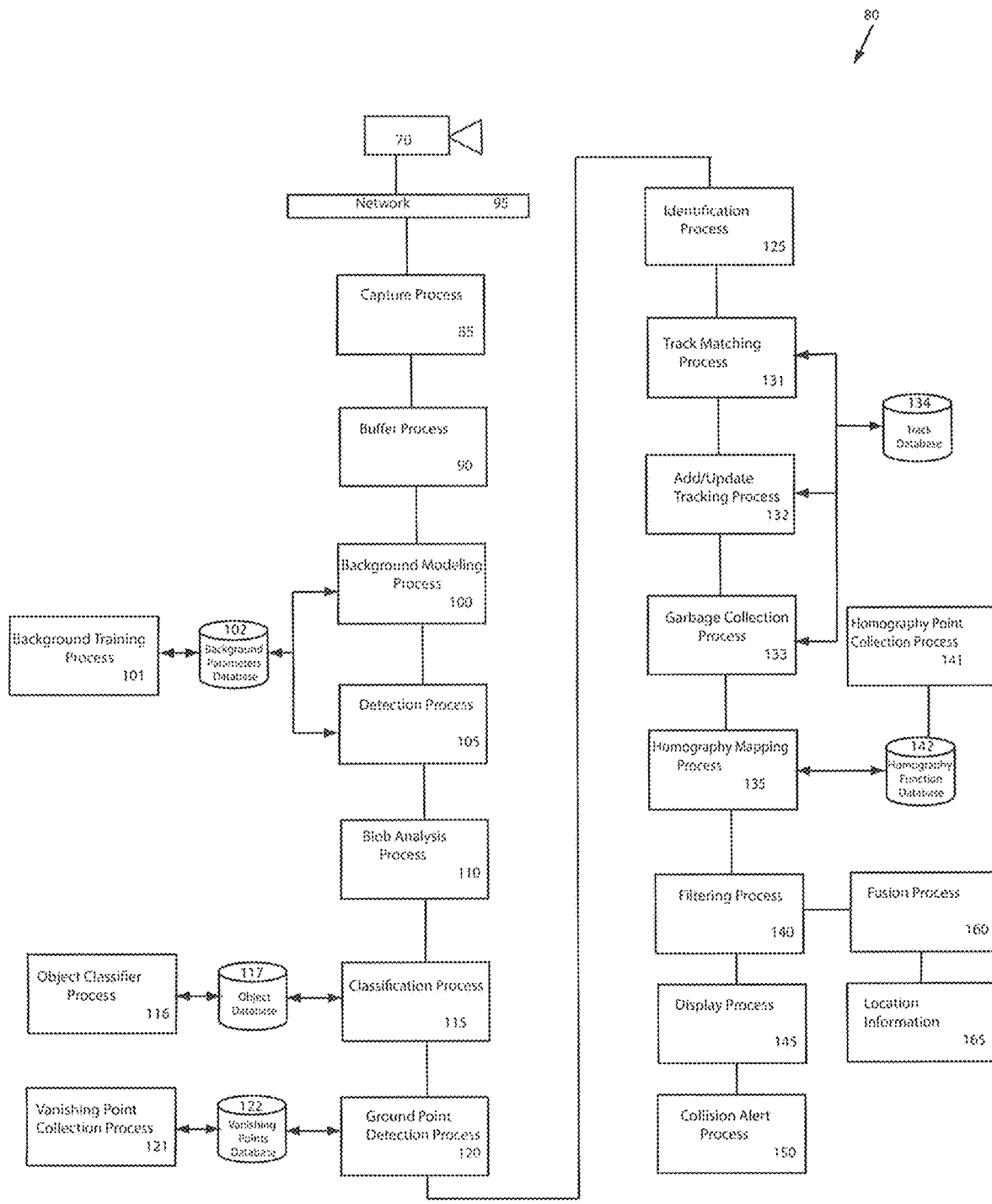
FIG. 3 depicts an exemplary CVD-system according to the present disclosure.

Referring to FIG. 3, CVD-system 80 according to the present disclosure may, for example, detect and track vehicles and pedestrians, geo-register them into the semantically labeled 2D or 3D world space, analyze the paths of vehicles and pedestrians, infer intent of their movement, make predictions of potential collisions, and alert the drivers and/or pedestrians of the potential collision in real-time.

In one exemplary embodiment according to the present disclosure, the CVD-system 80 may comprise a fusion process 160 to gather and process location information 165 about users like the driver of the vehicle 10 and/or pedestrians 20 and 30. The users' location information 165 may be obtained from GPS equipped devices in users' possession and/or users' cellular phones. As known in the art, it may be possible to obtain location information of cellular phones even if they are not equipped with GPS by using cellular towers 61a-e located in the vicinity to triangulate the proximate location of the cellular phone. As location information 165 is gathered and processed, a filtering process 140 may be used to predict/track the traveling paths of the users based on the location information 165. In one exemplary embodiment, tracking may be performed using methods such as, for example, Kalman or particle filters. A Kalman filter is a recursive filter that estimates the internal state of a linear dynamic system from a series of noisy measurements. Should either the driver of the vehicle 10 and/or pedestrians 20 and 30 fail to stop or try to avoid a collision, the CVD-system 80 may transmit a warning using a collision alert process 150. The CVD-system 80 may also comprise a display process 145 to display computer generated avatars representing moving objects in a 2D or 3D model representation of the area 71 to the users like driver of the vehicle 10 and/or pedestrians 20 and 30.

Because not every person will have a cellular phone and/or GPS equipped device that would allow the CVD-system 80 to gather and process location information 165, in one exemplary embodiment, the CVD-system 80 may utilize images from video camera 70 to identify all the moving objects and predict/warn about potential collisions.

The CVD-system 80 according to the present disclosure may also utilize video analysis software to analyze the real-time images captured by a video camera 70 and track the vehicle 10 and the pedestrians 20 and 30 as shown in FIG. 1a. The video analysis software may be configured to detect dynamic objects such as vehicle 10 and pedestrians 20, 30 observed by fixed infrastructure camera 70. Once the objects 10, 20 and 30 are detected, they may be represented as geo-registered computer avatars with correct spatial dimensions and merged with the previously generated 2D model (shown in FIG. 1b) or 3D model (not shown) and presented to the driver of the vehicle 10 and/or pedestrians 20 and 30. As the vehicle 10 and/or pedestrians 20 and 30 move, their respective avatars will also move in real-time on the corresponding 2D or 3D model. This may require calibration of the camera 70 with respect to the 2D or 3D model or the area 71. By knowing each infrastructure camera 70's extrinsic parameters such as position and orientation in the 2D or 3D model, and the mapping or relationship between mobile object positions on the ground in the 2D or 3D model and the positions of their images in the infrastructure camera field of view, the detection of mobile objects in the infrastructure camera images may be converted to positions of computer avatars in the 2D or 3D model. The detection, localization, and tracking of vehicles and pedestrians in the infrastructure camera field of view may be performed using, for example, an approach is covered by U.S. Pat. Nos. 7,599,894 and 7,558,762 which are incorporated herein by reference in their entirety.

Referring to FIG. 3, in one exemplary embodiment according to the present disclosure, the CVD-system 80 may comprise a capture process 85 to capture video data from the camera 70 and a buffer process 90 to store the captured video data prior to processing it. The video data from the camera 70 may be transmitted to the CVD-system 80 through, for example, network 95. In one exemplary embodiment, the network 95 may be the internet.

The CVD-system 80 may also comprise a background modeling process 100 to model static parts of the images captured by the camera 70 and to distinguish the moving objects from the static parts captured by the camera 70. The background modeling process 100 may utilize background training process 101 to collect information from the images captured by the camera 70 when there are no moving objects in the images or averaging images over time until any of the moving objects are averaged out from the images to provide a static background. Once the static background is determined, the parameters for the image pixels belonging to the background may be determined and stored in the background parameters database 102. After determining the parameters for the background image pixels, the CVD-system 80 may utilize a foreground detection process 105 to determine image pixels belonging to the moving objects. If parameters of the image pixel do not match the parameters of the background image pixels, the foreground detection process 105 identifies the image pixel as belonging to a moving object and is labeled as foreground pixel. The CVD-system 80 may also comprise a blob analysis process 110 to convert/group the foreground pixels into one or more sets of foreground blobs/regions to represent the one or more moving objects. The blob analysis process 110 may perform, for example, connectivity analysis to group the individual foreground pixels into foreground blobs/regions. After generating foreground blobs/regions, the CVD-system 80 may utilize an object classification process 115 to classify each foreground blob/region as a particular moving object, i.e. person, car, bus, bicyclists, etc. In one exemplary embodiment, the object classification process 115 may utilize heuristics to classify moving objects by assuming that certain blobs/region or certain size or with certain dimension correspond to a vehicle or pedestrian. In another exemplary embodiment, the object classification process 115 may utilize object classifier process 116 to create a classifier that may be able to analyze and identify the foreground blob/region based on data about people and vehicles collected, for example, from the internet. The data used by the object classifier process 116 may be stored in the object database 117.

The CVD-system 80 may also comprise a ground point detection process 120 to identify ground point of the moving blobs/regions. The ground point may be the bottom-most pixel of the blob/region that may be located along the line between the blob's centroid and the vanishing point. The vanishing point of an image is a point where all the vertical lines in the image converge. The vanishing points may be manually collected by a system operator using, for example, a vanishing point collection process 121 and stored in a vanishing point database 122. Detection of vanishing point is further described in "A new Approach for Vanishing Point Detection in Architectural Environments," by Carsten Rother, published in the year 2000 in the In Proc. $11^{th}$ British Machine Vision Conference, pages 382-391 which is incorporated herein by reference in its entirety.

The CVD-system 80 may also comprise an identification process 125 to create an appearance model for each of the foreground blob/region. This may be implemented by assigning a specific color and/or texture and/or other features for each foreground blob/region that would act as an identification signature/fingerprint for that particular foreground blob/region. This may be performed with histograms and/or spatiograms. As known in the art, a spatiogram is a histogram augmented with spatial bins which constrain spatial distribution of pixel color/texture values. The CVD-system 80 may further comprise a track matching process 131 to determine the traveling path of the foreground blobs/regions. This may be implemented by comparing the location/position of the foreground blob/region in each image with its location/position in the previous image(s). Track database 134 may be used to store the history of the different locations/positions of each of the foreground blobs/regions. As the location/position of the foreground blob/region changes, an add/update tracking process 132 may be used to update the track database 134. Should the foreground blobs/regions moves away from the camera 70 and no longer appear in the images or if one of the foreground blobs/regions turns out to be background noise, a garbage collection process 133 may be used to remove that foreground blob's/region's track from the track database 134.

The CVD-system 80 may also comprise a homography mapping process 135 to correlate the 2D view of the area 71 captured in the in the images by the camera 70 with the 2D or 3D model representation of the area 71 that may be generated using methods described above. As known in the art, a homography is an invertible transformation from the real projective plane to the projective plane that maps straight lines to straight lines. The homography mapping process 135 may use a ground point detected by the ground point detection block 120 and map it to the corresponding ground point in the 2D/3D model of the area 71. This may be implemented, for example, with planar homography mapping known in the art. The ground points in the 2D image from the camera 70 and their corresponding points in the 2D/3D model of the area 71 may be collected by a homography point collection process 141. The collected ground points may be landmarks or fiduciary marker/fiducials in the image from the camera 70 (e.g., corners on the ground). As known in the art, a fiduciary marker/fiducial is an object used in the field of view of an imaging system which appears in the image produced, for use as a point of reference or a measure. From the correspondences between the 2D image from the camera 70 and the 2D/3D model of the area 71, the CVD-system 80 may calculate a homography mapping function and store it in a homography function database 142.

In another exemplary embodiment, the CVD-system may also predict the paths of objects using kinematic and contextual information, determine whether a collision is probable, and generate warnings. The kinematic portion of the tracking can be performed using, for example, methods such as Kalman or particle filters, within a filtering process 140.

In one exemplary embodiment, the filtering process 140 may utilize data either from the homography mapping process 135 or from the fusion process 160 to predict paths of the moving objects. In another exemplary embodiment, the filtering process 140 may utilize data from the homography mapping process 135 and from the fusion process 160 to predict paths of the moving objects. In either embodiment, should either the driver of the vehicle 10 or the pedestrians 20 and 30 fail to stop or fail to try to avoid a collision, the CVD-system 80 may transmit a warning using a collision alert process 150. The CVD-system 80 may also comprise a display process 145 to display computer generated avatars representing moving objects in the 2D or 3D model representation of the area 71 to the users like a driver of the vehicle 10 and/or pedestrians 20 and 30.

Positions of avatars representing detected and tracked pedestrians 20 and 30 and vehicle 10 may be updated dynamically in real-time. Since CVD is a 2D or 3D dynamic model of the environment around the CVD-equipped vehicle, the viewpoint may be rendered from the point of view of the driver of the vehicle 10. The driver may then see the avatars representing pedestrians 20 and 30 and vehicles (not shown) embedded in the 2D or 3D model of his environment and with the correct positioning relative to his vehicle 10. The avatars can be made visible to the driver even though they may be behind occlusions such as buildings, walls, or other obstacles using multiple methods, such as by making the CVD semi-transparent, thus giving the driver a type of "x-ray vision". Onboard GPS and Inertial Measurement Unit (IMU) information may be used to determine the position and orientation of the CVD-equipped vehicle which in turn is used to determine the viewpoint that needs to be rendered. As known in the art, an IMU is an electronic device that measures and reports on a craft's velocity, orientation, and gravitational forces, using a combination of accelerometers and gyroscopes. The same data may be viewed by other end-users in the environment such as pedestrians 20 and 30 (including the blind users by using auditory or haptic clues), other vehicles, autonomous vehicles, or anyone who wishes a real-time 2D or 3D view of the traffic situation, including the positions and predicted paths of individual vehicles and pedestrians. A virtual camera may be placed anywhere in CVD in order to render any desired viewpoint. A virtual camera may be an imaginary camera whose image may be rendered by other real cameras with the knowledge of their relative positions/orientations. The virtual camera image at any desired viewpoint is reconstructed by the CVD camera images and 3D model. For example, the IMU and GPS in a smart phone may be used to place the virtual camera in the same position and orientation as the user in order to render CVD from his point of view.

By knowing their respective GPS coordinates and orientation, each vehicle 10 may determine its position in the representation relative to other dynamic objects, pedestrians 20 and 30, and the fixed environment. This allows the driver to have a global view of the surroundings and even see through walls without any onboard sensors other than GPS and an orientation sensor. The highly compressed nature of the representation allows real-time updates to be transmitted over low bandwidth links. By providing 3D track data for entities in a 3D world together with structural and semantic contextual information, much higher accuracy collision prediction may be provided than what is possible using only kinematic information.

Although FIG. 3 depicts CVD-system 80 utilizing data from one video camera 70, it is to be understood that the system 80 may utilize data from multiple video cameras 70.

The additional capability offered by CVD-system presently described is the use of structural and semantic context for improved tracking and path prediction. Using purely structural 2D or 3D contextual information, CVD-system may also predict temporary occlusions and where temporarily occluded objects will reappear. For example, by recognizing that the path of a vehicle goes underneath a bridge, the momentary occlusion of the vehicle as seen by an infrastructure camera can be discounted since it is expected that the vehicle will reappear on the other side. Semantic contextual information may be also used to further improve tracking and path prediction. By labeling a structure as a stop sign as opposed to a light standard, the expected paths of vehicles and threat warnings can be tailored more precisely.

In the CVD approach, according to the present disclosure, the fixed 2D or 3D structural and semantic models of the environment may be generated offline and downloaded to all CVD-equipped vehicles/equipment. They do not need to be updated at real-time rates. The geo-coordinates of objects detected in real-time by infrastructure sensors are transmitted to CVD vehicles so that the representative avatars for these objects can be inserted into CVD and updated at real-time rates. The real-time CVD 3D model of the environment with avatars representing vehicles and pedestrians is then made available to all CVD-equipped vehicles/equipment that enter the environment. The 2D or 3D CVD model may be customized for any CVD-equipped vehicle by setting the viewpoint of a virtual camera to match the position and orientation of the end-user vehicle.

Another advantage of CVD-system 80 for active safety, path prediction, and collision warning is the high degree of compression that can be achieved by using avatars to represent the video data. This allows the CVD representation to be quickly updated in real-time over a network since only the positions of the avatars need to be transmitted.

The CVD representation enables collision warning and threat detection to be provided as a service to end-users since it utilizes infrastructure-based cameras with a fixed cost that is independent of the number of users. No scene analysis sensors are needed on the user's device, whether he is a driver or a pedestrian with a PDA or smart phone.

In another exemplary embodiment, the CVD-systems 80, 480 according to the present disclosure may be used to assist users in finding parking spaces either on the street and/or parking lots and/or parking structures. For example, a parking management system according to the present disclosure may utilize the CVD-systems 80, 480 to, for example, detect and track vehicles, register them into the semantically labeled 2D or 3D representation of the parking structure and/or street and/or parking lot, analyze the paths of the vehicles leaving or entering different parking spaces, and alert other drivers of the empty parking space(s) in real-time.

There are many technical challenges in building parking spot recommendation systems. Prior-art technologies are typically limited to the use of induction loops, road tubes, piezo-electric cables, optical sensors (U.S. Pat. No. 6,650, 250) and weight-based sensors. While these sensors may be accurate, their use would require that the existing facilities be refitted which is laborious, expensive, and causes interruption in service during installation. Another option is to place ultrasonic sensors monitoring each parking space and run the wires to a central monitoring station. This solution is not very economical since the cost of running wires from each parking spot to a central database runs about $100 per meter. The use of wireless sensors have problems from coverage and interference. Cameras, if not positioned appropriately, will introduce issues ranging from luminance variations, interocclusions between cars, and occlusions caused by environmental obstacles. The ideal position for a camera would be to position it such that it provides a birds-eye view of the entire lot. Unfortunately, due to the multi-tiered parking structures, the typical parking lot cameras are not positioned high enough. Another challenge is to efficiently address different parking lot geometries with an easy to configure system. Most of the existing parking lots are being monitored using time-lapse video recording which is not suitable for object tracking and active recommendation. In summary, existing methods cannot accurately detect the state of many parking spaces due to occlusions, poor viewpoints, and high cost.

Figure 4A:
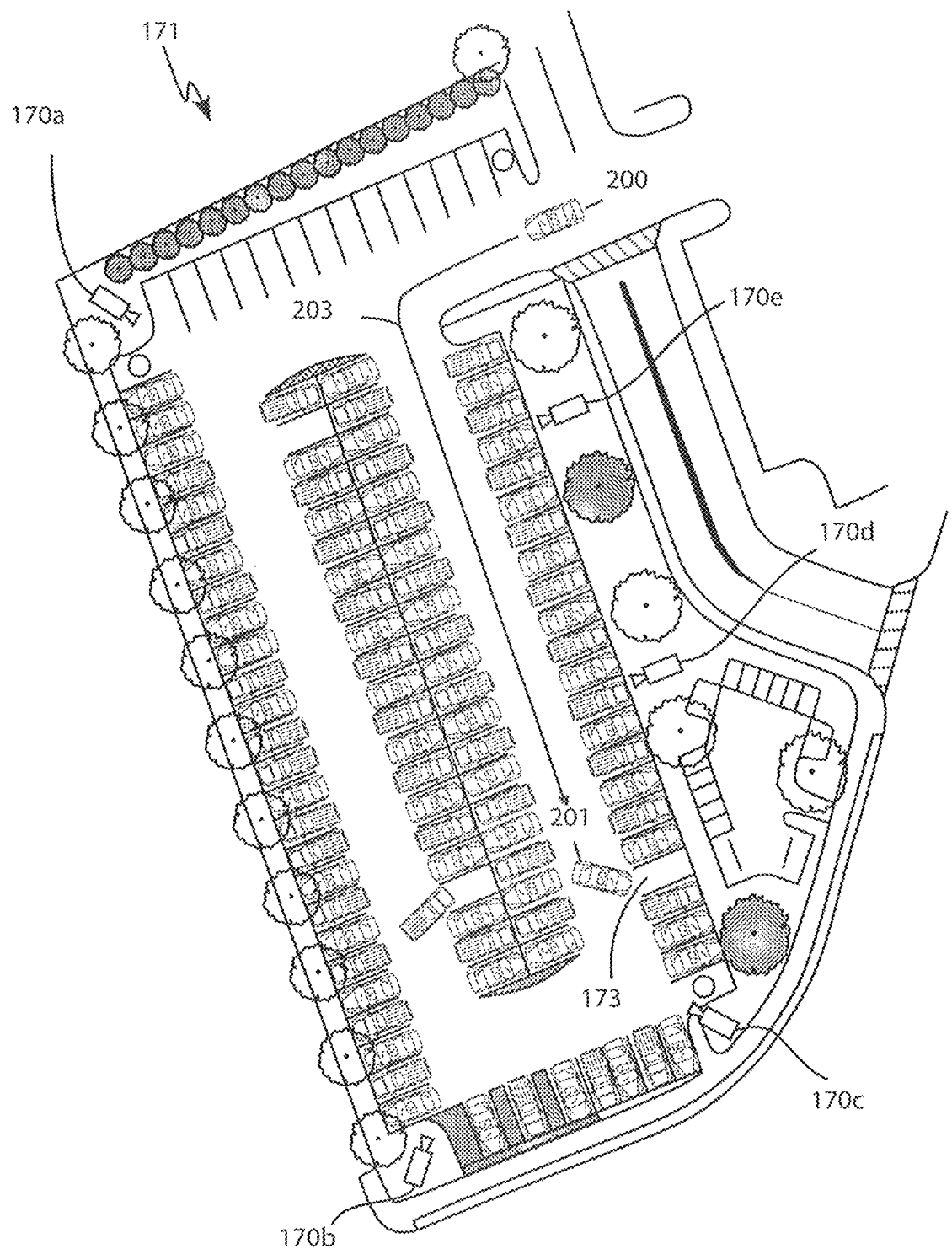
FIG. 4a depicts an exemplary parking lot.

Referring to parking area 171 depicted in FIG. 4*a*, driver of vehicle 200 may be looking for a parking space in the parking area 171. Depending on the size of the parking area 171, driver of the vehicle 200 may spend several minutes driving around the parking 171 looking for an empty parking space. Similarly, if the driver 200 is looking for a parking space on a street (not shown), the driver 200 may spend even more time driving around the block waiting for a parking space to free up. With the CVD-system 480 presently described, the driver of the vehicle 200 may receive a notice and possibly directions to an empty parking space either on the street (not shown) or parking area 171.

Figure 4B:
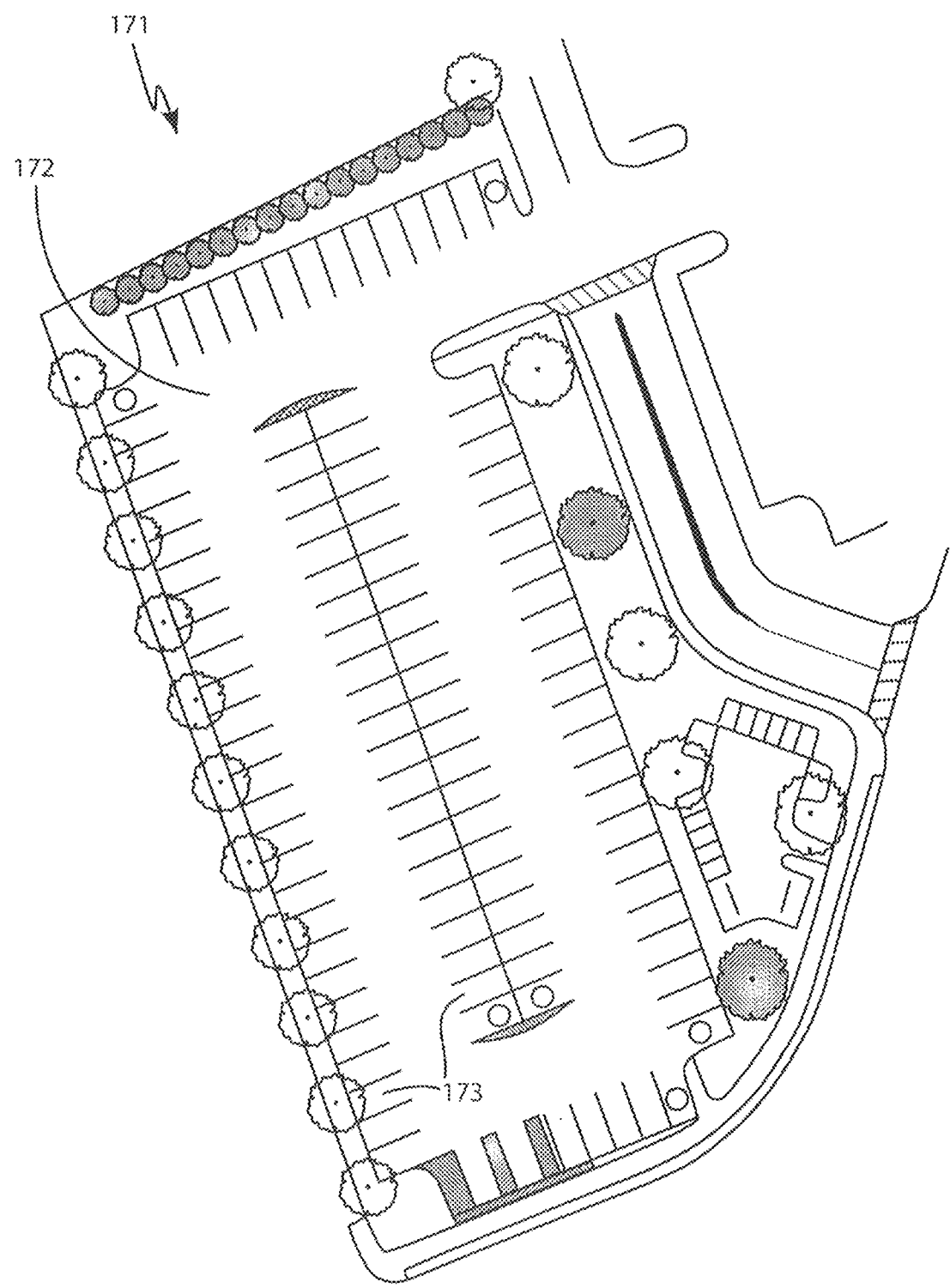

In one exemplary embodiment, the CVD-systems 80, 480 according to the present disclosure may utilize data from one or more detection sources to generate a 2D model of the area 171 as shown in FIG. 4*b*. The 2D model may depict and identify objects such as the parking surface 172, individual parking spaces 173, etc. The 2D model may be generated by using, for example, detection sources such as Image-based object detection and localization, Radar, Sonar, Light Detection and Ranging (LIDAR) or other mapping programs. It is to be understood that other detection sources may also be used to generate the required 2D model with location information for depicted objects. For example, the location information may be (x,y) coordinates on the map or (latitude, longitude) or some subset. The formation of the 2D segmented and labeled model shown in FIG. 4*b* may be performed once with occasional updates to incorporate any new buildings or other infrastructure. The segmentation and labeling of objects may be performed manually or automatically. Once the 2D model of a particular area has been generated, this 2D model may be utilized by all CVD-equipped vehicles and/or CVD-equipped cellular phones and/or other CVD-equipped portable devices that enter the modeled area.

In another exemplary embodiment, the CVD-systems 80, 480 according to the present disclosure may utilize data from one or more detection sources to generate a 3D model (not shown) of the area 171. The 3D model may depict and identify objects such as the parking lot 172, individual parking spaces 173, etc. The 3D model may be generated using, for example, detection sources such as Image-based object detection and localization, Radar, Sonar, and Light Detection and Ranging (LIDAR). It is to be understood that other detection sources may also be used to generate the required 3D model with location information for depicted objects. For example, the location information may be (x,y,z) coordinates on the map or (latitude, longitude, altitude) or some subset. Once the 3D model of the area 171 has been generated, this 3D model may be utilized by all CVD-equipped vehicles and/or CVD-equipped cellular phones and/or other CVD-equipped portable devices that enter the modeled area.

Figure 5:
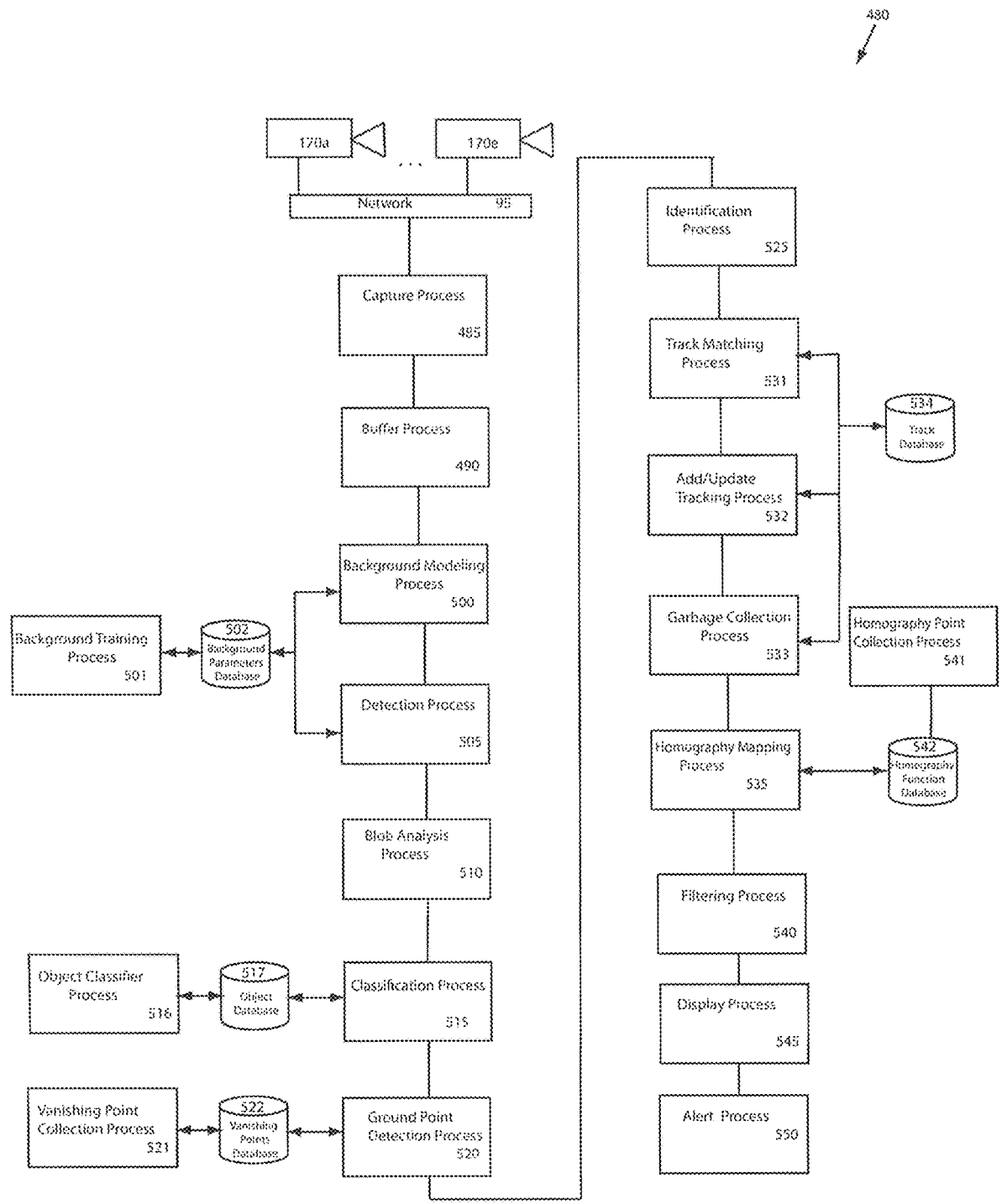
FIG. 5 depicts another exemplary CVD-system according to the present disclosure.

Referring to FIGS. 3 and 5, CVD-systems 80, 480 according to the present disclosure may, for example, detect and track vehicles, register them into the semantically labeled 2D or 3D representation of the parking structure and/or street and/or parking lot, analyze the paths of the vehicles leaving or entering different parking spaces, and alert other drivers of the empty parking space(s) in real-time.

In one exemplary embodiment according to the present disclosure, the CVD-systems 80, 480 according to the present disclosure may utilize video analysis software to analyze the real-time images captured by video cameras 170*a-e* and track vehicles in the parking structure (not shown) and/or street (not shown) and/or parking lot 172 as shown in FIG. 4*a*. The video analysis software may be configured to detect dynamic objects such as people and or vehicles observed by video cameras 170*a-e*. Once the dynamic objects are detected, they may be represented as geo-registered computer avatars with correct spatial dimensions and merged with the previously generated 2D model (shown in FIG. 4*b*) or 3D model (not shown) and presented to a driver of the vehicle 200. As a vehicle 201 leaves one of the parking stalls 173, their respective avatar will also move in real-time on the corresponding 2D or 3D model. This may require calibration of the cameras 170*a-e* with respect to the 2D or 3D model or the parking area 171. By knowing each infrastructure camera 170's extrinsic parameters such as position and orientation in the 2D or 3D model, and the mapping or relationship between mobile object positions on the ground in the 2D or 3D model and the positions of their images in the infrastructure camera field of view, the detections of mobile objects in the infrastructure camera images may be converted to positions of computer avatars in the 2D or 3D model.

Referring to FIGS. 3 and 5, in one exemplary embodiment according to the present disclosure, the CVD-systems 80, 480 may comprise a capture process 85, 485 to capture video data from the cameras 170*a-e* and a buffer process 90, 490 to store the captured video data prior to processing it. The video data from the cameras 170*a-e* may be transmitted to the CVD-systems 80, 480 through, for example, network 95.

The CVD-systems 80, 480 may also comprise a background modeling process 100, 500 to model static parts of the images captured by the cameras 170*a-e* and to distinguish the moving objects from the static parts captured by the camera 170a-e. The background modeling process 100, 500 may utilize background training process 101, 501 to collect information from the images captured by the camera 170a-e when there are no moving objects in the images or averaging images over time until any of the moving objects are averaged out from the images to provide a static background. Once the static background is determined, the parameters for the image pixels belonging to the background may be determined and stored in the background parameters database 102, 502. After determining the parameters for the background image pixels, the CVD-systems 80, 480 may utilize a foreground detection process 105, 505 to determine image pixels belonging to the moving objects. If parameters of the image pixel do not match the parameters of the background image pixels, the foreground detection process 105, 505 identifies the image pixel as belonging to a moving object and is labeled as foreground pixel. The CVD-systems 80, 480 may also comprise a blob analysis process 110, 510 to convert/group the foreground pixels into one or more sets of foreground blobs/regions to represent the one or more moving objects. The blob analysis process 110, 510 may perform, for example, connectivity analysis to group the individual foreground pixels into foreground blobs/regions. After generating foreground blobs/regions, the CVD-systems 80, 480 may utilize a classification process 115, 515 to classify each foreground blob/region as a particular moving object, i.e. person, car, bus, bicyclists, etc. In one exemplary embodiment, the classification process 115, 515 may utilize heuristics to classify moving objects by assuming that certain blobs/regions or certain size or with certain dimension correspond to a vehicle or pedestrian. In another exemplary embodiment, the classification process 115, 515 may utilize object classifier process 116, 516 to create a classifier that may be able to analyze and identify the foreground blob/region based on data about people and vehicles collected, for example, from the internet. The data used by the object classifier process 116, 516 may be stored in the object database 117, 517.

The CVD-systems 80, 480 may also comprise a ground point detection process 120, 520 to identify ground point of the moving blobs/regions. The ground point may be the bottom-most pixel of the blob/region that may be located along the line between the blob's centroid and the vanishing point. The vanishing point of an image is a point where all the vertical lines in the image converge. The vanishing points may be compiled using, for example, a vanishing point collection process 121, 521 and stored in a vanishing point database 122, 522.

The CVD-systems 80, 480 may also comprise an identification process 125, 525 to create an appearance model for each of the foreground blob/region. This may be implemented by assigning a specific color and/or texture and/or other features for each foreground blob/region that would act as an identification signature/fingerprint for that particular foreground blob/region. This may be performed with histograms and/or spatiograms. The CVD-systems 80, 480 may further comprise a track matching process 131, 531 to determine the traveling path of the foreground blobs/regions. For example, is the vehicle 201 parking or leaving the parking stall 173 as shown in FIG. 4a? This may be answered by comparing the location/position of the foreground blob/region in each image with its location/position in the previous image(s). Track database 134, 534 may be used to store the history of the different locations/positions of each of the foreground blobs/regions. As the location/position of the foreground blob/region changes, add/update tracking process 132, 532 may be used to update the track database 134, 534. Should the foreground blobs/regions moves away from the cameras 170a-e and no longer appear in the images or if one of the foreground blobs/regions turns out to be background noise, a garbage collection process 133, 533 may be used to remove that foreground blob's/region's track from the track database 134, 534.

The CVD-systems 80, 480 may also comprise a homography mapping process 135, 535 to correlate the 2D view of the area 171 captured in the in the images by the cameras 170a-e with the 2D model (shown in FIG. 4b) or 3D model (not shown) representation of the area 71 that may be generated using methods described above. The homography mapping process 135, 535 may use ground point detected by the ground point detection block 120, 520 and map it to the corresponding ground point in the 2D/3D model of the area 171. This may be implemented, for example, with planar homography mapping known in the art. The ground points in the 2D image from the cameras 170a-e and their corresponding points in the 2D/3D model of the area 171 may be collected by a homography point collection process 141, 541. The collected ground points may be landmarks or fiducials in the images from the cameras 170a-e (e.g., corners on the ground). From the correspondences between the 2D image from the cameras 170a-e and the 2D/3D model of the area 171, the CVD-system 80, 480 may calculate a homography mapping function and store it in a homography function database 142, 542.

In another exemplary embodiment, the CVD-systems 80, 480 may also predict the paths of objects, like people or vehicles. In one exemplary embodiment, the CVD-systems 80, 480 according to the present disclosure may use kinematic and contextual information to predict a path of a person to determine whether this person is on his/her way to his/her parked car in order to leave a parking stall 173. In another exemplary embodiment, the CVD-systems 80, 480 according to the present disclosure may use kinematic and contextual information to predict a path of a vehicle to determine whether this vehicle is about to park in one of the empty parking stalls 173. The kinematic portion of the tracking may be performed using, for example, methods such as Kalman or particle filters, within a filtering process 140, 540.

In one exemplary embodiment, the filtering process 140, 540 may utilize data from the homography mapping process 135, 535 to predict paths of the moving objects. Should the vehicle 201 start to leave the parking stall 173, the CVD-systems 480 may use an alert process 550 to transmit an alert to the vehicle 200 that a parking stall 173 is about to become empty. The CVD-systems 480 may also comprise a display process 545 to display computer generated avatars representing the vehicle 200 leaving the parking stall 173. The display process 545 may also be used to depict a path 203 showing the vehicle 200 where the parking stall 173 is about to become empty.

Positions of avatars representing detected and tracked people/vehicles may be updated dynamically in real-time. Since the CVD-systems 80, 480 comprises a 2D or 3D dynamic model of the area 171, the viewpoint may be rendered from the point of view of the driver of the vehicle 200. The driver may then see the avatars representing pedestrians and vehicles embedded in the 2D or 3D model of his environment and with the correct positioning relative to his vehicle 200. The avatars can be made visible to the driver even though they may be behind occlusions such as walls, or other parked vehicles using multiple methods, such as by making the CVD semi-transparent, thus giving the driver a type of "x-ray vision". Onboard GPS and IMU information may be used to determine the position and orientation of the CVD-equipped vehicle which in turn is used to determine the viewpoint that needs to be rendered. This allows the driver to have a global view of the surroundings and even see through walls without any onboard sensors other than GPS and an orientation sensor. The highly compressed nature of the representation allows real-time updates to be transmitted over low bandwidth links.

Although FIG. 5 depicts CVD-system 480 utilizing data from multiple video cameras 170a-e, it is to be understood that the system 480 may utilize data from a single video camera as shown in FIG. 3.

In the CVD approach, according to the present disclosure, the fixed 2D or 3D structural and semantic models of the environment may be generated offline and downloaded to all CVD-equipped vehicles. They do not need to be updated at real-time rates. The geo-coordinates of objects detected in real-time by infrastructure sensors are transmitted to CVD vehicles so that the representative avatars for these objects can be inserted into CVD and updated at real-time rates. The real-time CVD 3D model of the environment with avatars representing parked vehicles is then made available to all CVD-equipped vehicles that enter the area 171. The 2D or 3D CVD model may be customized for any CVD-equipped vehicle by setting the viewpoint of a virtual camera to match the position and orientation of the end-user vehicle.

In another exemplary embodiment, the CVD-systems 80, 480, 680 according to the present disclosure may be used to provide surveillance/security monitoring for a stationary object(s) such as, for example, one or more buildings. For example, a surveillance/security system according to the present disclosure may utilize the CVD-systems 80, 480, 680 to, for example, detect and track people and/or vehicles in the vicinity of a building being monitored, register them into a semantically labeled 2D or 3D representation of the building, analyze the paths of the people and/or vehicles, infer intent of their movement, make predictions of a potential unauthorized entrance into the building, and alert police and/or security personal of the potential unauthorized entry into the building in real-time.

Figure 6A:
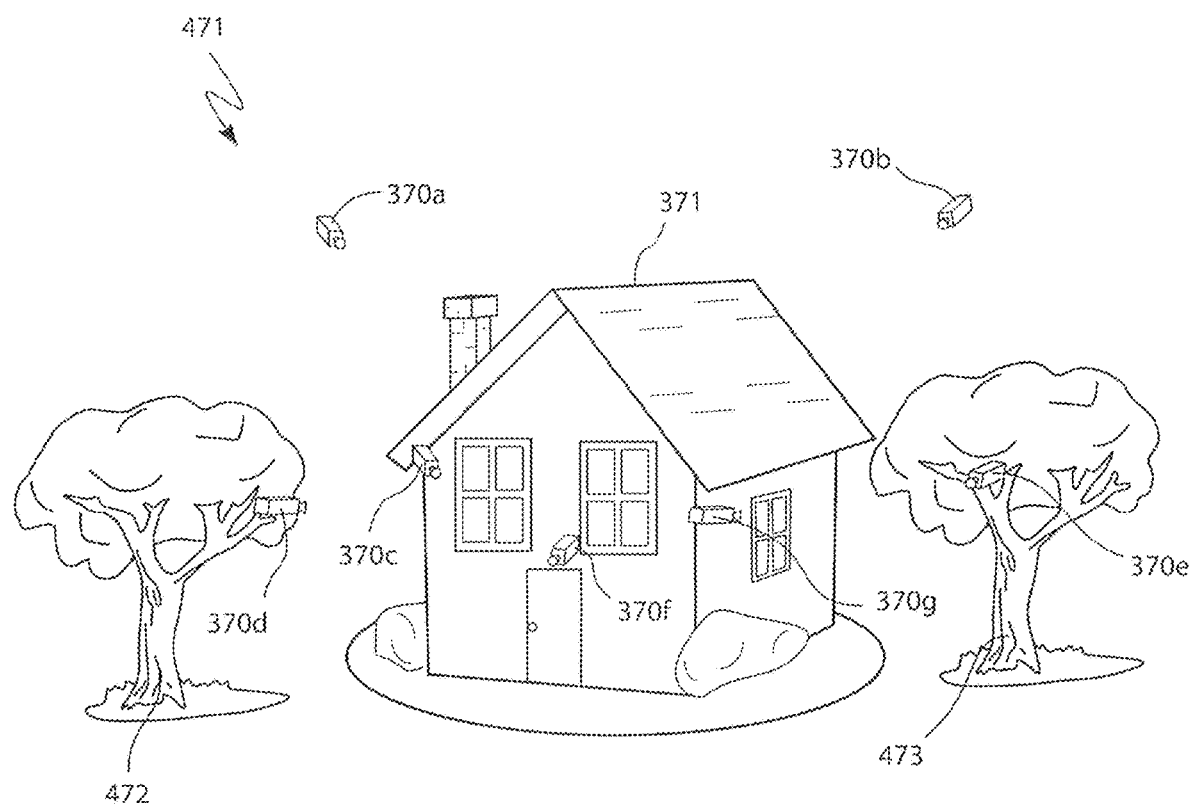
FIG. 6a depicts an exemplary area around a building being monitored by video cameras.
Figure 6B:
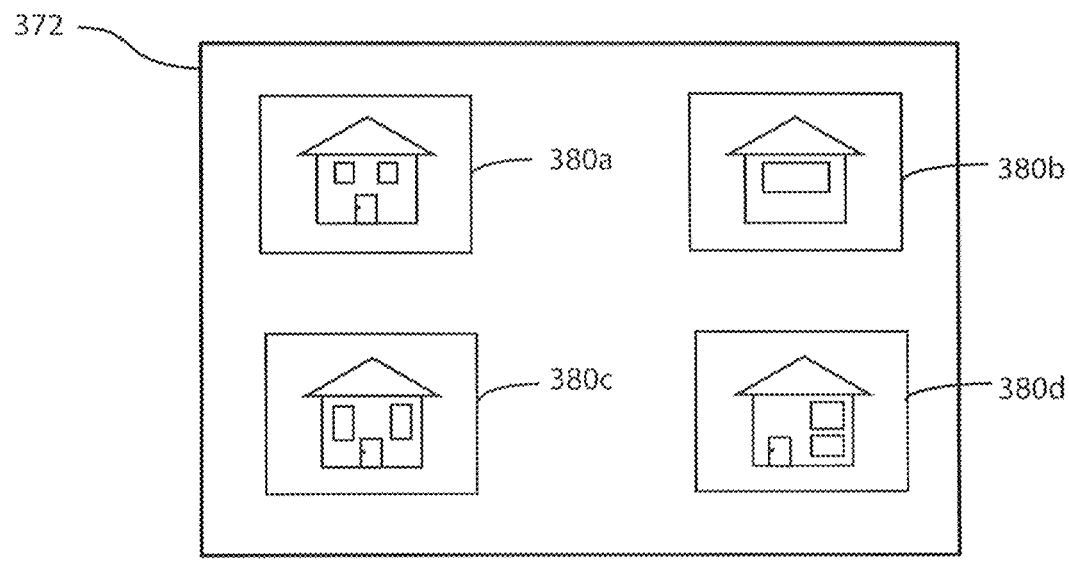
Figure 6C:
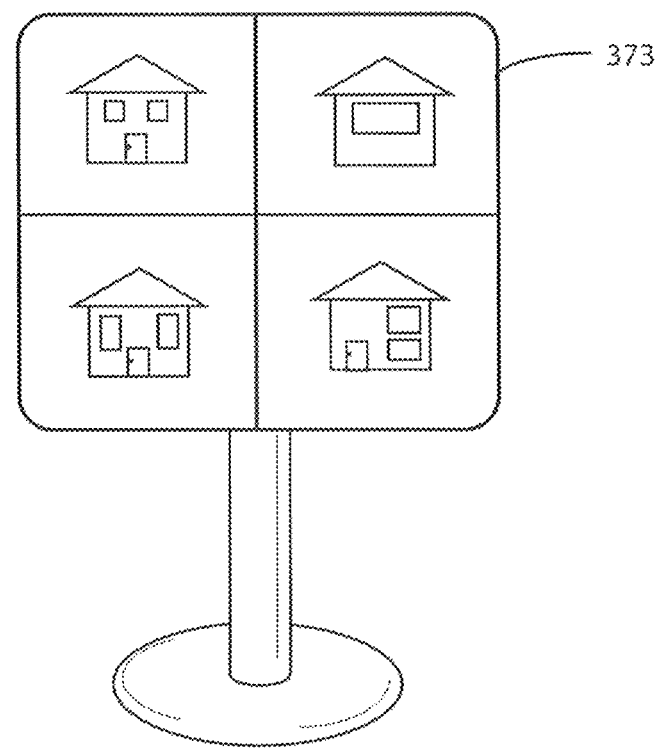
Figure 6D:
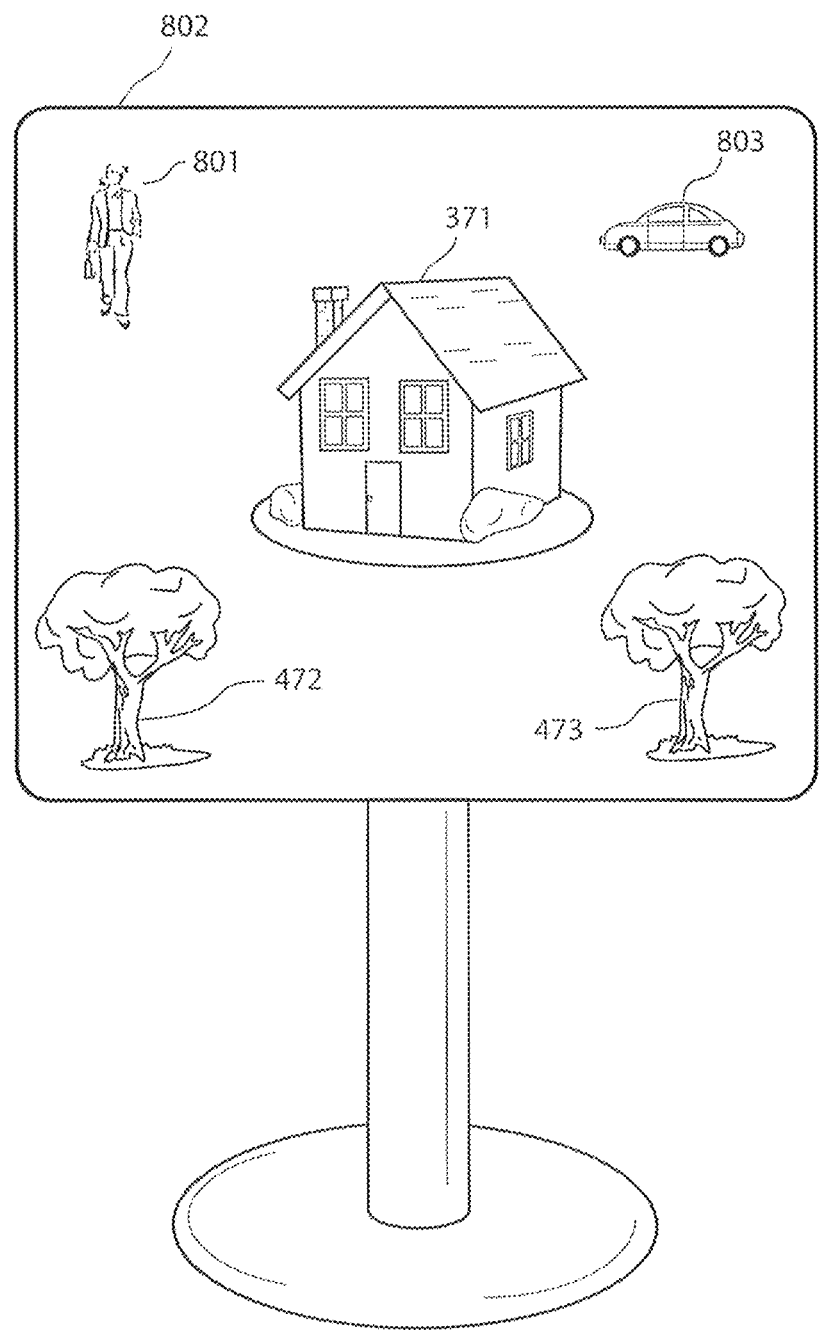

Referring to FIG. 6a, prior-art approaches to surveillance/security monitoring are implemented by installing multiple video cameras 370a-g to monitor activity at the house 371. Then the images from the cameras 370a-g are transmitted to either a security station 372 with multiple screens 380a-d as shown in FIG. 6b or to a security monitor 373 with multiple views from some of the cameras 370a-g as shown in FIG. 6c that may alternate with time. Unfortunately, this configuration requires someone like a security guard to sit in front of the security station 372 or security monitor 373 and constantly, simultaneously, monitor multiple views from the cameras 370a-g. Contrary to the prior art, the CVD equipped surveillance/security system presently described may be implemented with a single monitor 802 depicting a 2D or 3D representation of the area 471 (as shown in FIG. 6d) and may be configured to alert the security guard of the potential unauthorized entry into the building 371 by a person 801 in real-time.

In one exemplary embodiment, the CVD-systems 80, 480, 680 according to the present disclosure may utilize data from one or more detection sources to generate a 2D model of the area 471 as shown in FIG. 6a. The 2D model may depict and identify objects such as the house 371, trees 472 and 473, etc. The 2D model may be generated using, for example, detection sources such as Image-based object detection and localization, Radar, Sonar, Light Detection and Ranging (LIDAR) or other mapping programs. It is to be understood that other detection sources may also be used to generate the required 2D model with location information for depicted objects. For example, the location information may be (x,y) coordinates on the map or (latitude, longitude) or some subset. The formation of the 2D segmented and labeled model shown in FIG. 6a may be performed once with occasional updates to incorporate any new buildings or other infrastructure. The segmentation and labeling of objects may be performed manually or automatically. Once the 2D model of a particular area has been generated, this 2D model may be utilized by all CVD-equipped vehicles and/or CVD-equipped cellular phones and/or other CVD-equipped portable devices that monitor the modeled area 471.

In another exemplary embodiment, the CVD-systems 80, 480, 680 according to the present disclosure may utilize data from one or more detection sources to generate a 3D model (not shown) of area 471. The 3D model may depict and identify objects such as the house 371, trees 472 and 473, etc. The 3D model may be generated using, for example, detection sources such as Image-based object detection and localization, Radar, Sonar, and Light Detection and Ranging (LIDAR). It is to be understood that other detection sources may also be used to generate the required 3D model with location information for depicted objects. For example, the location information may be (x,y,z) coordinates on the map or (latitude, longitude, altitude) or some subset. Once the 3D model of a particular area has been generated, this 3D model may be utilized by all CVD-equipped vehicles and/or CVD-equipped cellular phones and/or other CVD-equipped portable devices that monitor the modeled area 471.

Figure 7:
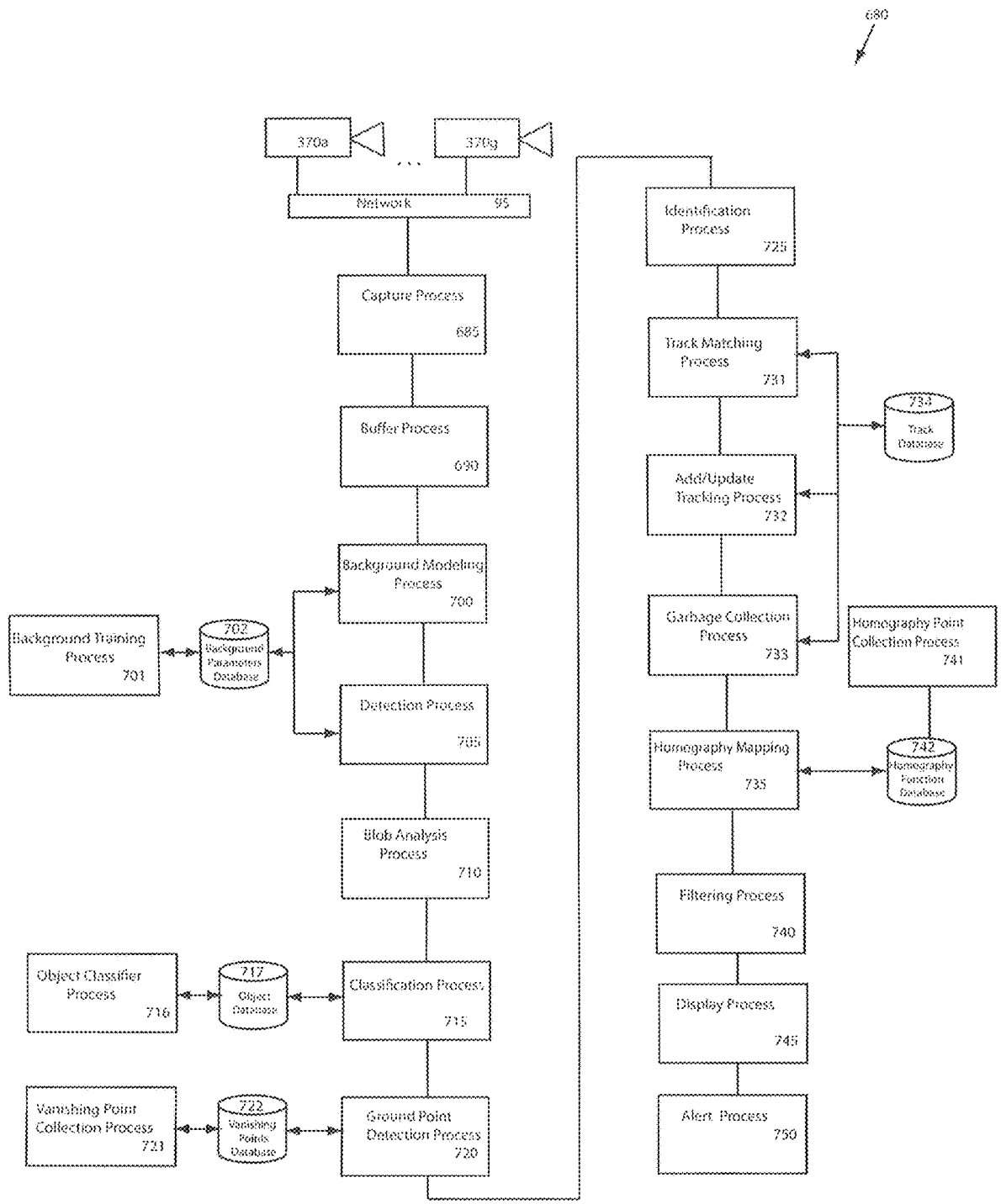
FIG. 7 depicts another exemplary CVD-system according to the present disclosure.

Referring to FIGS. 3, 5 and 7, CVD-systems 80, 480, 680 according to the present disclosure may, for example, detect and track people 801 and/or vehicles 803 in the vicinity of a building 371 being monitored, register them into a semantically labeled 2D or 3D representation of the building and/or surrounding area, analyze the paths of the people and/or vehicles, infer intent of their movement, make predictions of potential unauthorized entrance into the building, and alert police and/or security personal of the potential unauthorized entry into the building in real-time.

In one exemplary embodiment according to the present disclosure, the CVD-systems 80, 480. 680 according to the present disclosure may utilize video analysis software to analyze the real-time images captured by video cameras 370a-g and track people 801 and/or vehicle 803 in the vicinity of the building 371 being monitored as shown in FIG. 6d. The video analysis software may be configured to detect dynamic objects such as people 801 and or vehicles 803 observed by video cameras 370a-g. Once the dynamic objects are detected, they may be represented as geo-registered computer avatars with correct spatial dimensions and merged with the previously generated 2D or 3D model and presented to a security guard monitoring the building 371 on the monitor 802. As the dynamic objects move, their respective avatars will also move in real-time on the corresponding 2D or 3D model. This may require calibration of the cameras 370a-g with respect to the 2D or 3D model or the area 471. By knowing each infrastructure camera 370s' extrinsic parameters such as position and orientation in the 2D or 3D model, and the mapping or relationship between mobile object positions on the ground in the 2D or 3D model and the positions of their images in the infrastructure camera field of view, the detections of mobile objects in the infrastructure camera images may be converted to positions of computer avatars in the 2D or 3D model.

Referring to FIGS. 3, 5 and 7, in one exemplary embodiment according to the present disclosure, the CVD-systems

80, 480, 680 may comprise a capture process 85, 485, 685 to capture video data from the cameras 370a-g and a buffer process 90, 490, 690 to store the captured video data prior to processing it. The video data from the cameras 370a-g may be transmitted to the CVD-systems 80, 480, 680 through, for example, network 95.

The CVD-systems 80, 480, 680 may also comprise a background modeling process 100, 500, 700 to model static parts of the images captured by the cameras 370a-g and to distinguish the moving objects from the static parts captured by the camera 370a-g. The background modeling process 100, 500, 700 may utilize background training process 101, 501, 701 to collect information from the images captured by the camera 370a-g when there are no moving objects in the images or averaging images over time until any of the moving objects are averaged out from the images to provide a static background. Once the static background is determined, the parameters for the image pixels belonging to the background may be determined and stored in the background parameters database 102, 502, 702. After determining the parameters for the background image pixels, the CVD-systems 80, 480, 680 may utilize a foreground detection process 105, 505, 705 to determine image pixels belonging to the moving objects. If parameters of the image pixel do not match the parameters of the background image pixels, the foreground detection process 105, 505, 705 identifies the image pixel as belonging to a moving object and is labeled as foreground pixel. The CVD-systems 80, 480, 680 may also comprise a blob analysis process 110, 510, 710 to convert/group the foreground pixels into one or more sets of foreground blobs/regions to represent the one or more moving objects. The blob analysis process 110, 510, 710 may perform, for example, connectivity analysis to group the individual foreground pixels into foreground blobs/regions. After generating foreground blobs/regions, the CVD-systems 80, 480, 680 may utilize a classification process 115, 515, 715 to classify each foreground blob/region as a particular moving object, i.e. person, car, bus, bicyclists, etc. In one exemplary embodiment, the classification process 115, 515, 715 may utilize heuristics to classify moving objects by assuming that certain blobs/regions or certain size or with certain dimension correspond to a vehicle or pedestrian. In another exemplary embodiment, the classification process 115, 515, 715 may utilize object classifier process 116, 516, 716 to create a classifier that may be able to analyze and identify the foreground blob/region based on data about people and vehicles collected, for example, from the internet. The data used by the object classifier process 116, 516, 716 may be stored in the object database 117, 517, 717.

The CVD-systems 80, 480, 680 may also comprise a ground point detection process 120, 520, 720 to identify ground point of the moving blobs/regions. The ground point may be the bottom-most pixel of the blob/region that may be located along the line between the blob's centroid and the vanishing point. The vanishing point of an image is a point where all the vertical lines in the image converge. The vanishing points may be manually compiled using, for example, a vanishing point collection process 121, 521, 721 and stored in a vanishing point database 122, 522, 722.

The CVD-systems 80, 480, 680 may also comprise an identification process 125, 525, 725 to create an appearance model for each of the foreground blob/region. This may be implemented by assigning a specific color and/or texture and/or other features for each foreground blob/region that would act as an identification signature/fingerprint for that particular foreground blob/region. This may be performed with histograms and/or spatiograms. The CVD-systems 80, 480, 680 may further comprise a track matching process 131, 531, 731 to determine the traveling path of the foreground blobs/regions. This may be implemented by comparing the location/position of the foreground blob/region in each image with its location/position in the previous image(s). Track database 134, 534, 734 may be used to store the history of the different locations/positions of each of the foreground blobs/regions. As the location/position of the foreground blob/region changes, add/update tracking process 132, 532, 732 may be used to update the track database 134, 534, 734. Should the foreground blobs/regions moves away from the cameras 370a-g and no longer appear in the images or if one of the foreground blobs/regions turns out to be background noise, a garbage collection process 133, 533, 733 may be used to remove that foreground blob's/region's track from the track database 134, 534, 734.

The CVD-systems 80, 480, 680 may also comprise a homography mapping process 135, 535, 735 to correlate the 2D view of the area 471 captured in the in the images by the cameras 370a-g with the 2D model (shown in FIG. 6b) or 3D model (not shown) representation of the area 471 that may be generated using methods described above. The homography mapping process 135, 535, 735 may use ground point detected by the ground point detection block 120, 520, 720 and map it to the corresponding ground point in the 2D/3D model of the area 471. This may be implemented, for example, with planar homography mapping known in the art. The ground points in the 2D image from the cameras 370a-g and their corresponding points in the 2D/3D model of the area 471 may be collected by a homography point collection process 141, 541, 741. The collected ground points may be landmarks or fiducials in the images from the cameras 370a-g (e.g., corners on the ground). From the correspondences between the 2D image from the cameras 370a-g and the 2D/3D model of the area 471, the CVD-systems 80, 480, 680 may calculate a homography mapping function and store it in a homography function database 142, 542, 742.

In another exemplary embodiment, the CVD-systems 80, 480, 680 may also predict the paths of objects, like people and/or vehicles, using kinematic and contextual information, determine whether they may try to approach the building 371, and generate warnings. The kinematic portion of the tracking may be performed using, for example, methods such as Kalman or particle filters, within a filtering process 140, 540, 740.

In one exemplary embodiment, the filtering process 140, 540, 740 may utilize data from the homography mapping process 135, 535, 735 to predict paths of the moving objects. Should the approaching person try to approach the building 371, the CVD-system 680 may transmit an alert to a security personal using an alert process 750. The CVD-system 680 may also comprise a display process 745 to display computer generated avatars representing moving objects in the 2D or 3D model representation of the area 471 being videotaped by cameras 370a-g to the security personal.

Positions of avatars representing detected and tracked people/vehicles may be updated dynamically in real-time. Since CVD is a 2D or 3D dynamic model of the area 471, the viewpoint may be rendered in any desired viewpoint, including from a birds-eye point of view of the entire area 471. The security guard may then see the avatars representing people and vehicles embedded in the 2D or 3D model of area 471. The avatars can be made visible to the security guard even though they may be behind occlusions such as buildings, fences, walls, or other vehicles using multiple methods, such as by making the CVD semi-transparent, thus giving the security guard a type of "x-ray vision".

Although FIG. 7 depicts CVD-system 680 utilizing data from multiple video cameras 370a-g, it is to be understood that the CVD-system 680 may utilize data from a single video camera as shown in FIG. 3.

The additional capability offered by CVD-system is the use of structural and semantic context for improved tracking and path prediction. Using purely structural 2D or 3D contextual information, CVD-system may also predict temporary occlusions and where temporarily occluded objects will reappear. For example, by recognizing that the path of a person goes behind a tree or a wall, the momentary occlusion of the person as seen by an infrastructure camera can be discounted since it is expected that the person will reappear on the other side.

In the CVD approach, according to the present disclosure, the fixed 2D or 3D structural and semantic models of the environment may be generated offline and downloaded to monitor 802 for viewing by the security guard. They do not need to be updated at real-time rates. The geo-coordinates of objects 801 and 803, detected in real-time by infrastructure cameras 370a-g, may be transmitted to the monitor 802 so that the representative avatars for these objects can be inserted into CVD and updated at real-time rates. The real-time CVD 2D or 3D model of the environment with avatars representing vehicles and people is then made available to the security guard on the monitor 802.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A method comprising:
   receiving a two dimensional or a three dimensional computer generated representation of an area;
   receiving a plurality of images of the area captured by one or more video cameras;
   detecting a first moving object in the plurality of images, wherein detecting the first moving object comprises performing a foreground detection process on the plurality of images to determine image pixels;
   providing a computer generated avatar representing the first moving object;
   correlating the images of the area captured by the one or more video cameras with the two dimensional or three dimensional computer generated representation of the area;
   displaying the computer generated avatar in the two dimensional or the three dimensional computer generated representation of the area;
   performing a background modeling process on the plurality of images to identify static background;
   determining background image pixels;
   matching the image pixels to the background image pixels;
   identifying unmatched image pixels as foreground pixels;
   converting the foreground pixels into one or more sets of foreground blobs to represent at least the first moving object;
   classifying the one or more sets of foreground blobs; and
   identifying ground point of the one or more sets of foreground blobs.

2. The method of claim 1, wherein correlating the images captured by the one or more video cameras with the two dimensional or three dimensional computer generated representation of the area comprises:
   identifying at least one ground point in the plurality of images associated with the first moving object; and
   mapping the at least one ground point to a corresponding point in the two dimensional or the three dimensional computer generated representation of the area.

3. The method of claim 1, further comprising:
   determining a traveling path of the first moving object from the plurality of images; and
   updating a position of the computer generated avatar in the two dimensional or the three dimensional computer generated representation of the area based on the traveling path.

4. The method of claim 1, further comprising:
   classifying the first moving object as a person or a vehicle.

5. The method of claim 4, wherein generating a computer representation of the first moving object comprises:
   generating a computer representation of the person.

6. The method of claim 4, wherein providing a computer generated avatar comprises:
   providing a computer generated avatar of the vehicle.

7. The method of claim 1, further comprising:
   detecting a second moving object in the plurality of images; determining a traveling path of the first moving object;

determining a traveling path of the second moving object; and providing a warning when the first moving object is on a collision course with the second moving object.

8. The method of claim 1, wherein the area is for parking vehicles and the first moving object is a vehicle leaving a parking spot.

9. The method of claim 8, further comprising:
providing an alert when the vehicle leaves the parking spot.

10. The method of claim 8, further comprising:
providing a driving direction to the parking spot.

11. The method of claim 1, wherein the two dimensional or the three dimensional computer generated representation of the area depicts a stationary object.

12. The method of claim 11, further comprising:
determining a traveling path of the first moving object; and
providing a warning when the first moving object approaches the stationary object.

13. The method of claim 12, wherein the stationary object is a building and the first moving object is a person.

14. The method of claim 12, wherein the stationary object is a building and the first moving object is a vehicle.

15. The method of claim 1, further comprising:
receiving global positioning coordinates of a second moving object in the area; determining traveling path of the first moving object;
determining traveling path of the second moving object based on the changes in the global positioning coordinates of the second moving object; and
providing a warning if the first moving object is on a collision course with the second moving object.

16. The method of claim 1, further comprising:
receiving global positioning coordinates of the first moving; detecting a second moving object in the plurality of images; receiving global positioning coordinates of the second moving object;
determining traveling path of the first moving object based on the changes in the global positioning coordinates of the first moving object and based on the location of the first moving object in the plurality of images;
determining traveling path of the second moving object based on the changes in the global positioning coordinates of the second moving object and based on the location of the second moving object in the plurality of images; and
providing a warning if the first moving object is on a collision course with the second moving object.

17. The method of claim 1 further comprises:
performing a background modeling process on the plurality of images to identify static background; and
determining background image pixels.

18. The method of claim 17, wherein detecting the first moving object comprises performing a foreground detection process on the plurality of images to determine image pixels.

19. The method of claim 18 further comprises:
matching the image pixels to the background image pixels; and identifying unmatched image pixels as foreground pixels.

20. The method of claim 19 further comprises:
converting the foreground pixels into one or more sets of foreground blobs to represent at least the first moving object; and
classifying the one or more sets of foreground blobs.

21. The method of claim 20 further comprises identifying ground point of the one or more sets of foreground blobs.

22. The method of claim 21, wherein correlating the images of the area captured by the one or more video cameras with the two dimensional or three dimensional computer generated representation of the area comprises mapping the identified ground point to a corresponding ground point in the two dimensional or three dimensional computer generated representation of the area.

23. The method of claim 20 further comprises creating an appearance model for the one or more sets of foreground blobs.

24. The method of claim 23, wherein creating an appearance model for the one or more sets of foreground blobs is performed with histograms.

25. The method of claim 1, wherein the two dimensional or a three dimensional computer generated representation of an area is generated using one or more detection sources.

26. The method of claim 25, wherein the one or more detection sources is an image-based object detection and localization detection source, a radar detection source, a sonar detection source, or a light detection and ranging (LIDAR) detection source.

27. A method comprising:
receiving a two dimensional or a three dimensional computer generated representation of an area;
receiving a plurality of images of the area captured by one or more video cameras;
detecting a first moving object in the plurality of images, wherein detecting the first moving object comprises performing a foreground detection process on the plurality of images to determine image pixels;
providing a computer generated avatar representing the first moving object;
correlating the images of the area captured by the one or more video cameras with the two dimensional or three dimensional computer generated representation of the area;
displaying the computer generated avatar in the two dimensional or the three dimensional computer generated representation of the area;
performing a background modeling process on the plurality of images to identify static background;
determining background image pixels;
matching the image pixels to the background image pixels;
identifying unmatched image pixels as foreground pixels;
converting the foreground pixels into one or more sets of foreground blobs to represent at least the first moving object;
classifying the one or more sets of foreground blobs; and
creating an appearance model for the one or more sets of foreground blobs,
wherein creating an appearance model for the one or more sets of foreground blobs is performed with spatiograms.

28. A method comprising:
receiving a two dimensional or a three dimensional computer generated representation of an area;
receiving a plurality of images of the area captured by one or more video cameras;
detecting a first moving object in the plurality of images, wherein detecting the first moving object comprises performing a foreground detection process on the plurality of images to determine image pixels;
providing a computer generated avatar representing the first moving object;

correlating the images of the area captured by the one or more video cameras with the two dimensional or three dimensional computer generated representation of the area; and displaying the computer generated avatar in the two dimensional or the three dimensional computer generated representation of the area;

performing a background modeling process on the plurality of images to identify static background;

determining background image pixels;

matching the image pixels to the background image pixels;

identifying unmatched image pixels as foreground pixels;

converting the foreground pixels into one or more sets of foreground blobs to represent at least the first moving object;

classifying the one or more sets of foreground blobs;

creating an appearance model for the one or more sets of foreground blobs; and determining a traveling path of the one or more sets of foreground blobs.

\* \* \* \* \*